United States Patent
Hornig et al.

[11] 4,182,139
[45] Jan. 8, 1980

[54] ELASTIC SHAFT COUPLING

[75] Inventors: Rudolf Hörnig, Esslingen; Bruno Beeskow, Bietigheim; Günter Wörner, Stetten-Rommelshausen, all of Fed. Rep. of Germany

[73] Assignee: Daimler-Benz Aktiengesellschaft, Fed. Rep. of Germany

[21] Appl. No.: 796,385

[22] Filed: May 12, 1977

[30] Foreign Application Priority Data

May 18, 1976 [DE] Fed. Rep. of Germany ....... 2622003

[51] Int. Cl.² .............................................. F16D 3/58
[52] U.S. Cl. ...................................... 64/12; 64/27 NM
[58] Field of Search ..................... 64/12, 13, 27 NM

[56] References Cited

U.S. PATENT DOCUMENTS

| | | | |
|---|---|---|---|
| 1,316,903 | 9/1919 | Kuentzel | 64/12 |
| 1,424,051 | 7/1922 | Wayne | 64/13 |
| 2,532,755 | 12/1950 | Bloomfield | 64/12 |
| 4,019,346 | 4/1977 | Fukuda | 64/12 |

FOREIGN PATENT DOCUMENTS

| | | | |
|---|---|---|---|
| 814364 | 9/1951 | Fed. Rep. of Germany | 64/27 NM |
| 1021212 | 12/1957 | Fed. Rep. of Germany | 64/12 |
| 2425250 | 12/1975 | Fed. Rep. of Germany | 64/12 |
| 2534684 | 2/1977 | Fed. Rep. of Germany | 64/12 |
| 1049411 | 8/1953 | France | 64/12 |
| 1087861 | 3/1955 | France | 64/12 |
| 366848 | 1/1939 | Italy | 64/12 |
| 2482/70 | 3/1965 | Japan | 64/12 |
| 24436 | of 1914 | United Kingdom | 64/12 |
| 221981 | 9/1924 | United Kingdom | 64/12 |
| 628664 | 6/1947 | United Kingdom | 64/12 |
| 917680 | 3/1963 | United Kingdom | 64/27 NM |
| 1258849 | 12/1971 | United Kingdom | 64/13 |

*Primary Examiner*—Charles J. Myhre
*Assistant Examiner*—R. C. Turner
*Attorney, Agent, or Firm*—Craig and Antonelli

[57] ABSTRACT

An elastic shaft coupling, especially a cardan shaft coupling for motor vehicles, which is equipped with a disk-shaped elastic base body, in which are arranged about the center axis of the base body an even number of connecting elements having parallel axes; of these connecting elements, successive ones are coordinated to opposite sides and are connected by way of at least one band loop that is supported on at least one of the respective connecting elements by way of an elastic intermediate member.

24 Claims, 8 Drawing Figures

ELASTIC SHAFT COUPLING

The present invention relates to an elastic shaft coupling, especially to a cardan shaft or universal joint shaft coupling for motor vehicles, with a disk-shaped elastic base body, in which an even number of connecting elements with parallel axes are arranged about a center axis, of which successive connecting elements following one another in the circumferential direction are coordinated to mutually opposite connecting sides and are connected respectively by at least one band loop.

Elastic shaft couplings of this type which are used especially as cardan shaft or universal joint shaft couplings for motor vehicles, customarily include additionally a centering means between the two shaft ends which is formed, for example, by a shaft pin provided at one shaft end, which engages into an elastic bush coordinated to the other shaft end. However, in practice a certain alignment has to take place by way of such a centering means only during load changes or with an unloaded coupling, since with a loaded coupling the band loops form a force triangle closed in the direction of rotation and establish a form-locking connection, which necessarily already has as a consequence a centering action. A radial stiffness or rigidity is thus brought about during the load operation by way of this positive centering action effected by the band loops in parallel to the central centering means so that quite different radial stiffnesses or rigidities result in the load and partial load operation, and excessively high radial stiffnesses or rigidities exist for the load operation, with a corresponding correct matching to the partial load operation, which favor the transmission of vibrations.

The present invention is therefore concerned with the task to assure in shaft couplings of the aforementioned type a preselected radial stiffness or rigidity also for the load operation, which is achieved according to the present invention in that the band loop abuts on at least one of the respective connecting elements by way of an elastic intermediate member. The connection which is established by way of the band loops and which is, as such, stiff against torsion and as a result thereof provides a centering action, is so relaxed by such a construction that a predetermined yieldingness is achieved also in the radial direction, by means of which, in addition to the given angular movability and in addition to the possibility to keep the torsional rigidity different in opposite directions of rotation by an appropriate dimensioning of the band loops, also a predetermined spring stiffness in the radial direction is achieved for such an elastic coupling and therewith also a particularly good vibration damping.

In one embodiment of the present invention, the elastic intermediate member may be coordinated to the connecting element which is respectively the front connecting element in the direction of rotation for the pulling or for the pushing operation, or one elastic intermediate member may also be coordinated to both connecting elements which are surrounded by a band loop. Preferably elastic bushes are used as elastic intermediate members.

In the construction of the connecting elements as sleeves, the same are preferably constructed as bush supports.

In order to arrive at as uniform as possible a loading and stressing of the intermediate members constructed as bushes and preferably consisting of rubber or similar material, it has proved advantageous if the elastic intermediate members have approximately the same strength in relation to the respective load direction which, especially with the construction of the connecting elements as sleeves is attainable in a simple manner in that the same are provided with outer extensions which extend approximately radially to the center axis.

Especially according to a further feature of the present invention, it is appropriate if the coupling is constructed self-centering and is provided with a preferably endless band loop which is supported on respective successive connecting elements alternately radially inwardly and radially outwardly. The aimed-at spring stiffness predetermined in the radial direction also is not impaired by such a self-centering action because this band loop serving the self-centering purpose is supported respectively by way of the elastic intermediate members on the connecting elements and thus at the base body. Such a self-centering means, therebeyond, also operates as safety feature in case of a tearing or breaking of one or several band loops.

According to a further feature of the present invention, a centering action can also be attained in that the base body is provided centrally with a centering bush which is connected with at least three radially symmetrically arranged connecting elements by way of at least one band loop, whereby these band loops may be supported with respect to the centering bush and/or with respect to the connecting elements by way of an elastic intermediate element, respectively. Furthermore, it is also possible within the frame of the present invention to provide the centering bush with an elastic insert bush, by way of which the shaft pin to be inserted is elastically supported with respect to the base body. Especially with such a construction, the band loops guided over the centering bush and the connecting elements need not be supported with respect to the connecting elements by way of an elastic intermediate support in order to assure the desired radial yieldingness.

Accordingly, it is an object of the present invention to provide an elastic shaft coupling, especially a cardan shaft coupling for motor vehicles, which avoids the aforementioned shortcomings and drawbacks encountered heretofore in the prior art by extremely simple and operationally reliable means.

Another object of the present invention resides in a shaft coupling which effectively eliminates the transmission of vibrations under substantially all load conditions.

A further object of the present invention resides in a shaft coupling which assures a predetermined radial stiffness also for the full-load operation while preserving a correct matching also to the partial load operation.

Still another object of the present invention resides in a shaft coupling in which the torsional rigidity can be kept different in opposite directions of rotation.

These and other objects, features and advantages of the present invention will become more apparent from the following description when taken in connection with the accompanying drawing which shows, for purposes of illustration only, several embodiments in accordance with the present invention, and wherein.

Figure 1:
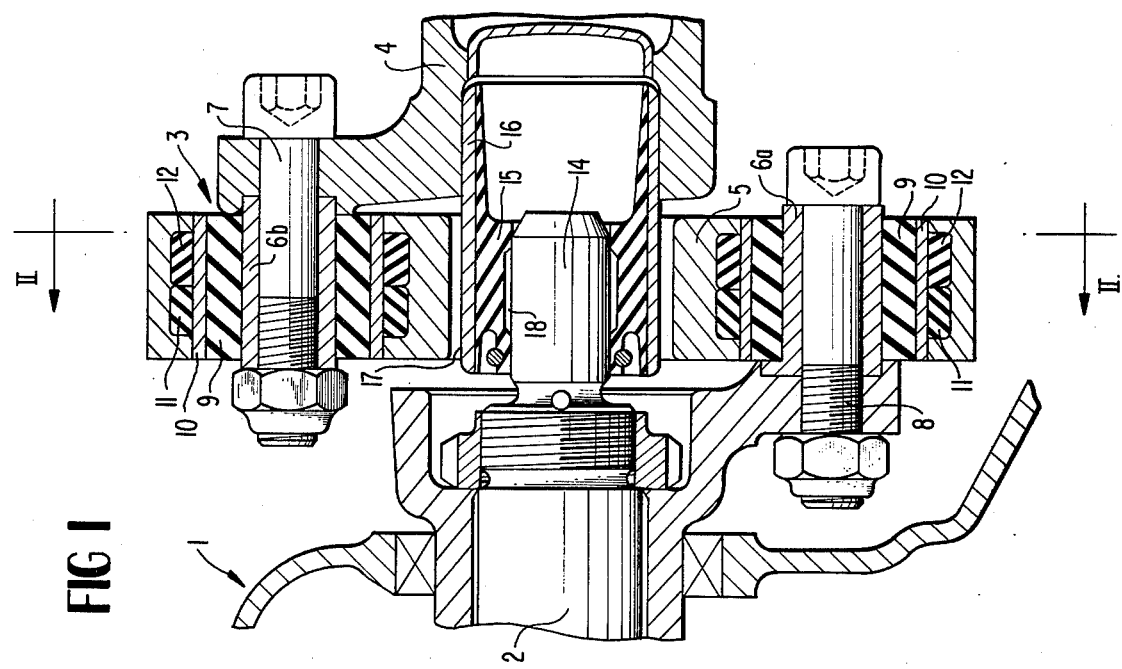
FIG. 1 is an axial cross-sectional view through an elastic shaft coupling according to the present invention which is arranged in the transition between the transmission output shaft and the cardan shaft of a motor vehicle.
Figure 2:
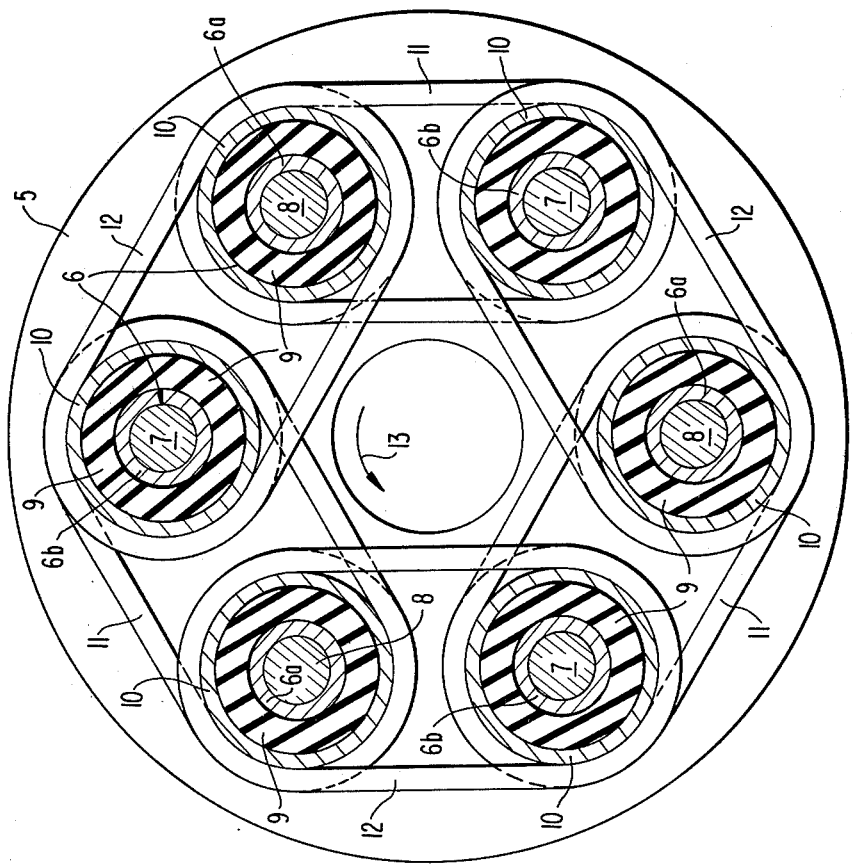
FIG. 2 is a simplified cross-sectional view of the shaft coupling illustrated in FIG. 1 and taken along line II—II of FIG. 1.

Referring now to the drawing wherein like reference numerals are used throughout the various views to designate like parts, in the embodiment illustrated in FIGS. 1 and 2, reference numeral 1 generally designates the housing of a transmission of a motor vehicle, whose output shaft 2 is connected by way of an elastic shaft coupling generally designated by reference numeral 3 with the cardan shaft or universal joint shaft 4 which is illustrated only partially in this figure. The connection of the transmission output shaft 2 and of the cardan shaft 4 with the elastic shaft coupling 3 takes place respectively in three points so that the elastic shaft coupling 3 includes in its elastic base body 5 altogether six connecting elements generally designated by reference numeral 6 which are respectively offset with respect to one another by 60° and have substantially parallel axes. In the illustrated embodiment, the connecting elements 6 are formed by sleeves embedded in the base body 5. Each of these sleeves 6 is traversed by a fastening bolt 7 or 8, and, on the one hand, the cardan shaft 4 and, on the other, the transmission output shaft 2 are connected by way of the fastening bolts 7 and 8, respectively, with the elastic shaft coupling 3.

The sleeves 6 serving as connecting elements are each surrounded in the embodiment illustrated in FIGS. 1 and 2 by an elastic intermediate member 9 in the form of a bush, to which a cylindrical casing-like sleeve 10 is coordinated in the illustrated embodiment, on which rest the axially offset band loops 11 and 12. The band loops 11 connect the connecting elements 6a which are located in front in relation to the driving direction (arrow 13) for the pulling operation and which are connected with the transmission output shaft 2 by way of the fastening bolts 8, with the connecting elements 6b disposed to the rear in relation to the driving direction in the pulling operation, which connecting elements 6b are connected with the cardan shaft 4 by way of the fastening bolts 7. Thus in the pulling operation, the band loops 11 take over the transmission of the torque, whereas in the pushing operation the torque is introduced by way of the fastening bolts 7 connected with the cardan shaft 4 and is transmitted from the connecting elements 6b coordinated thereto by way of the band loops 12 to the connecting element 6a now disposed to the rear in relation to the direction of rotation 13, which is connected with the transmission input shaft 2 by way of the respective fastening bolt 8.

Corresponding to the different magnitude of the moments which occur during pulling and pushing operation, the loops of thread or filament material vulcanized into a base material which form the band loops are constructed in such a manner, not further illustrated herein in detail that the specific load in relation to the respective maximum torque to be transmitted is approximately the same so that the same stiffness or rigidity of the elastic shaft coupling results in the circumferential direction for the pulling and the pushing operation. Furthermore, by the use of the intermediate members 9 formed herein by elastic bushes, the coupling connection which is realized by the band loops 11 and 12 that are far-reachingly non-yielding in the pulling direction, and which is self-centering under load by reason of the force conditions, is loosened up to such an extent that also a predetermined radial spring action is attained corresponding to the elasticity of the intermediate members, by means of which the transmission of vibrations is prevented.

In order to obtain also in that case the required centering between th transmission output shaft 2 and the cardan shaft 4, when no torque is transmitted, or when a temporary relieving or unstressing of the respective bands results as a result of a change in load, the transmission output shaft 2 is provided in the illustrated embodiment with a pin 14 which engages in an elastic bush 15 (FIG. 1) which is arranged in a sleeve 16 which is inserted concentrically into the cardan shaft 4 and projects beyond the same toward the transmission output shaft 2, whereby it engages in a central aperture 17 of the base body 5. The elastic bush 15 is thereby provided according to the present invention with an undercut 18 within its longitudinal center area over a large part of its length so that a support characteristic results, which is at first relatively soft and which becomes harder only with larger deflections. It is avoided thereby that especially in the load operation, a parallel connection occurs with respect to the radial spring action, which might lead already with smaller deflections to a transmission of vibrations.

In the embodiment of an elastic coupling according to the present invention, illustrated in FIG. 3, the same construction exists in principle as in the embodiment according to FIGS. 1 and 2, and, accordingly, analogous reference numerals are used in the embodiment of FIG. 3 as also in the other embodiments to be described hereinafter to designate corresponding parts. In the embodiment according to FIG. 3, in which analogous reference numerals of the 100 series are used to designate corresponding parts, the elastic base body of the shaft coupling is thus designated by reference numeral 105 while the connecting elements coordinated thereto are designated by reference numerals 106a and 106b, whereby fastening bolts 107 and 108 again engage into the fastening bolts 106a and 106b. The connecting elements which are generally designated by reference numeral 106 are surrounded by bush-like elastic intermediate members 109, to which is also coordinated a casing-like sleeve 110, on which rest the corresponding band loops 111 and 112.

Figure 3:
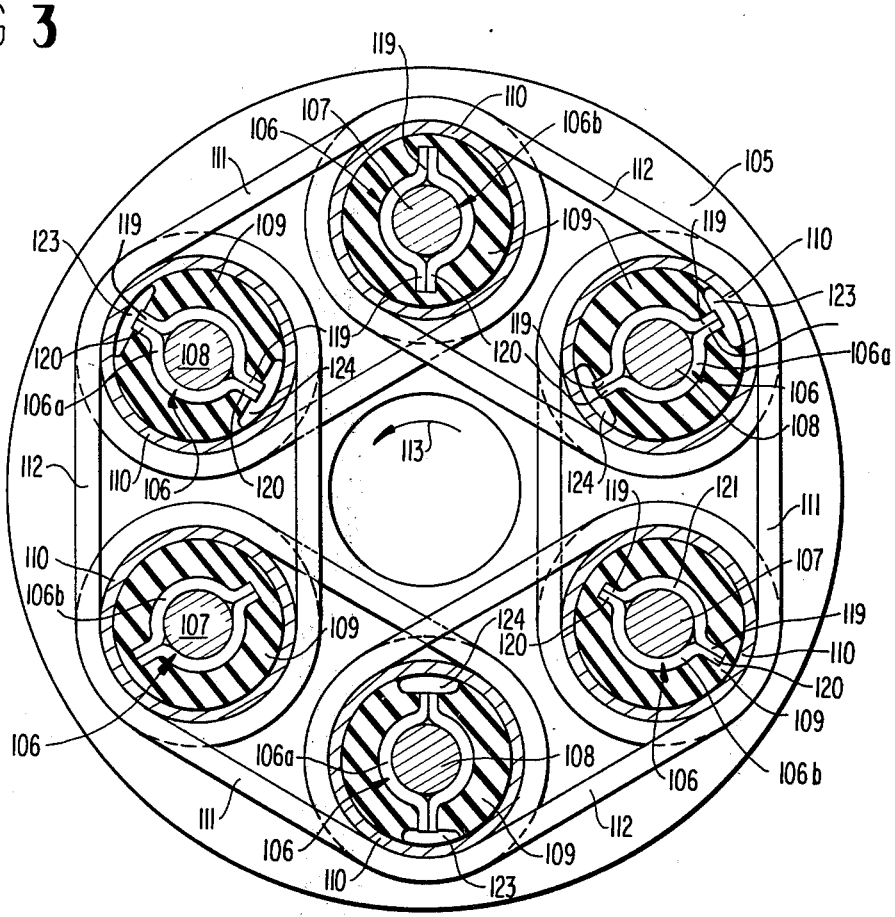
FIG. 3 is a cross-sectional view, similar to FIG. 2, of a modified embodiment of a shaft coupling according to the present invention.

Differing from the embodiment according to FIGS. 1 and 2, the connecting elements 106 are provided in the embodiment according to FIG. 3 with radially outer and radially inner extensions 119 and 120, which extend approximately radially to the center axis of the base body 105 and which are formed in that the sleeve of the respective connecting element 106 is composed of two tubular halves 121 and 122 which are joined together within the area of their outwardly bent edges so that the extensions 119 and 120 are formed by the same.

Moreover, in the embodiment according to FIG. 3, one recess 123 and 124 each is provided radially beyond the extensions 119 and 120 for the elastic intermediate members 109 which are coordinated to the fastening bolts 108 that are disposed respectively in front during the pulling operation in relation to the direction of rotation 113, in order to prevent impairments of the radial yieldingness as well as also local overloads of the elastic intermediate members 109 within the area of the extensions 119 and 120. Altogether, a more uniform loading and stressing of the elastic material of the instruments member 109 and a more free relative movement possibility of the connecting elements in the radial direction is achieved by the recesses 123 and 124.

Figure 4A:
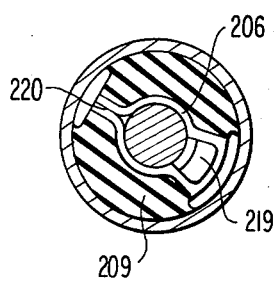
FIGS. 4a and 4b are partial cross-sectional views illustrating modified embodiments of the connecting elements with elastic intermediate members in accordance with the present invention.
Figure 4B:
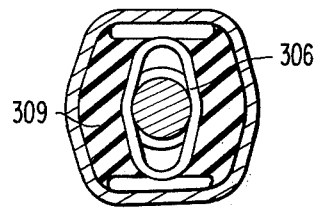

The embodiments according to FIGS. 4a and 4b for the connecting elements 206 and 306 and for the elastic intermediate members 209 and 309 serve the same purpose, whereby each of these embodiments may be used in conjunction with one of the embodiments according to FIGS. 1 to 3 both for the connecting elements which are disposed in front in the direction of rotation and/or to the rear in the direction of rotation in relation to the pulling operation as also for the connecting elements which are disposed in front and/or to the rear in the direction of rotation in relation to the pushing operation.

Altogether the embodiments according to FIGS. 4a and 4b have the purpose to provide a shape for the connecting elements 206 and 306 which leads to an evening out of the load of the elastic intermediate member, whereby it must be considered that, on the one hand, the intermediate member is loaded and stressed in the direction of rotation by the force transmitted to and introduced into the connecting element by way of the fastening bolt and that, on the other, only forces can be absorbed by the band loops whose resultants extend in the longitudinal direction of the strands of the band loops.

Accordingly, in the embodiment according to FIG. 4a, the connecting element 206 is enlarged radially outwardly approximately wedge-shaped—the radial line is indicated in dash and dotted lines—so that an extension 219 which is enlarged compared to the radially inner extension 220 results radially outwardly.

In the embodiment according to FIG. 4b, an essentially diamond-shaped connecting element 306 elongated in the radial direction indicated in dash and dotted line is provided which is without cover by the elastic intermediate member 309 radially inwardly and radially outwardly thereof and which is covered in the circumferential direction corresponding to its contours by the elastic intermediate member 309, whence also an approximately diamond-shaped base shape results for the surrounding casing-like sleeve.

Figure 5:
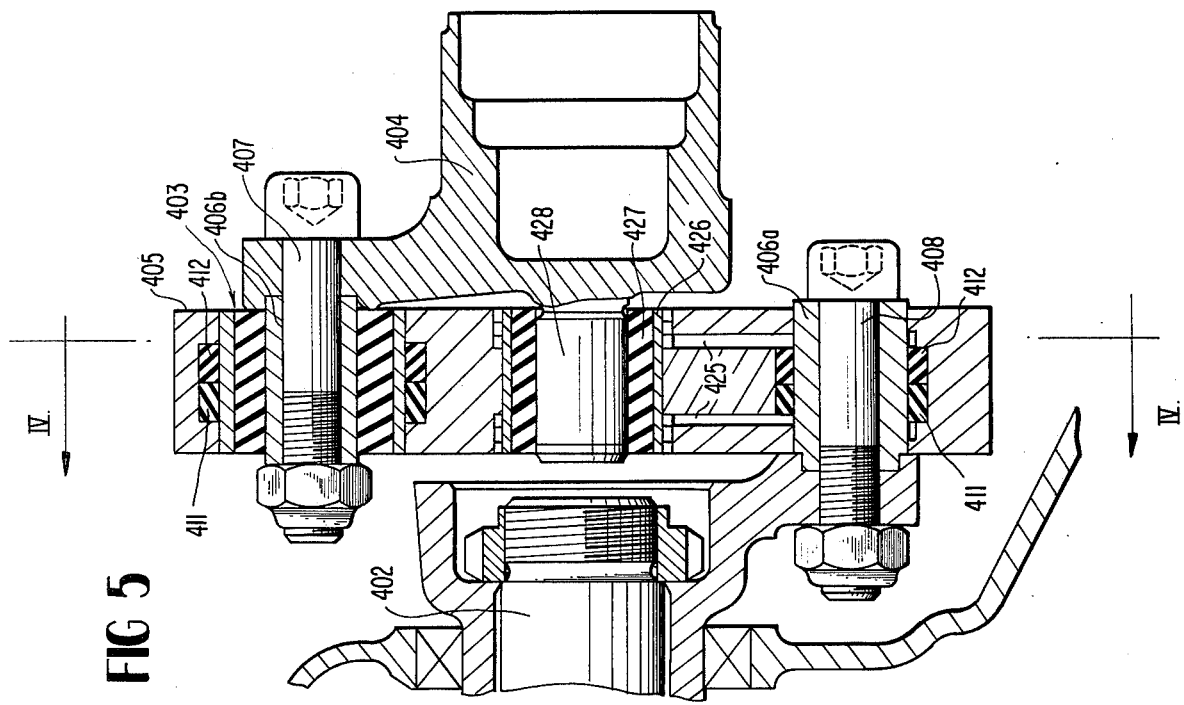
FIG. 5 is an axial cross-sectional view, similar to FIG. 1, through a still further modified embodiment of a shaft coupling according to the present invention.
Figure 6:
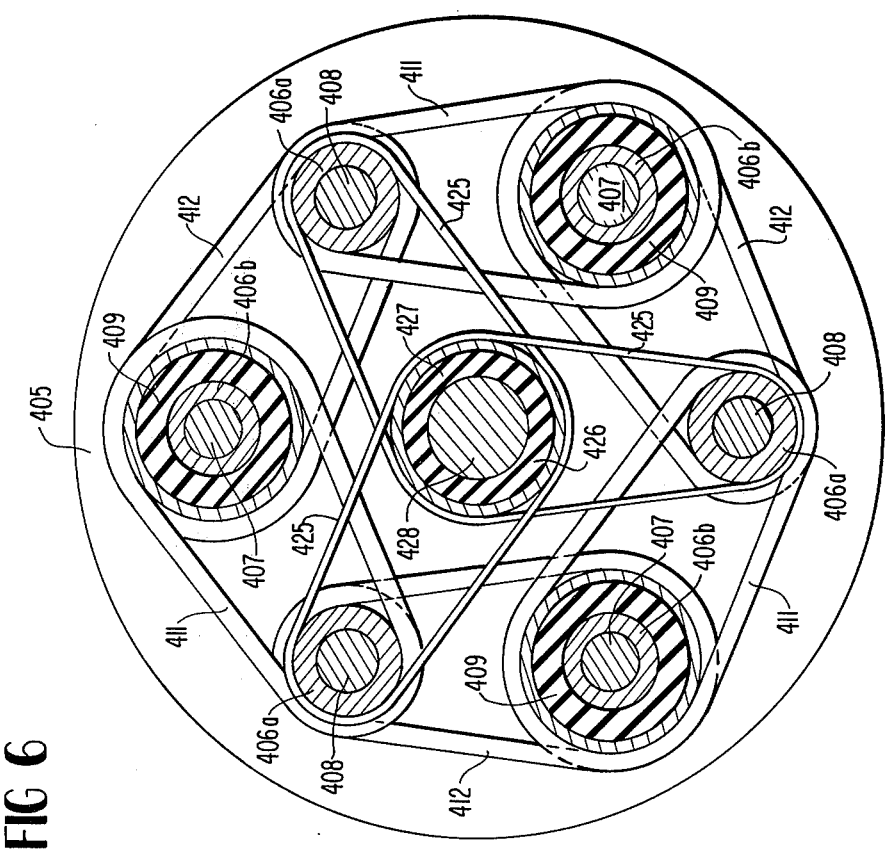
FIG. 6 is a cross-sectional view of the shaft coupling illustrated in FIG. 5 and taken along line VI—VI of FIG. 5.

Analogous reference numerals of the 400 series are also used again in the description of the embodiment according to FIGS. 5 and 6 in which the transmission output shaft is designated by reference numeral 402. The connection of the transmission output shaft 402 with the elastic shaft coupling 403 takes place by way of fastening bolts 408 which engage in connecting elelents 406a, to which correspond connecting elements 406b in the connection of the cardan shaft 404 with the elastic base body 405, whereby fastening bolts 407 engage in the connecting elements 406b. Differing from the previously described embodiments, elastic intermediate members 409 are coordinated in this embodiment only to the connecting elements 406b so that the band loops 411 and 412, on the one hand, rest directly on the connecting elements 406a and, on the other, are supported on the connecting elements 406b by way of the elastic intermediate members 409.

Additionally, in this embodiment, which, however, would also be possible in conjunction with the other descibed embodiments of the present invention, band loops 425 are provided for the self-centering of the elastic shaft coupling, which are each placed over a concentric centering bush 426 and a connecting element 406a whereby the connecting element 406a of this embodiment, as already described, is surrounded preferably without interposition of an elastic intermediate member by the respective band loop. The support of the band loops 425 on the respective connecting element 406a which in the illustrated embodiment again represents the connecting element disposed in front in the direction of rotation for the pulling operation, could also take place according to the present invention in case an elastic intermediate member were coordinated to the same which, however, is not illustrated herein. Furthermore, it would also be possible within the scope of the present invention, differing from the illustrated embodiment, to support the band loops radially outwardly on the cnnecting elements 406b, or to provide also a number of band loops corresponding altogether to the number of the connecting elements 406 and thus to brace the centering bush 426 with respect to all connecting elements by means of corresponding band loops.

The centering bush 426 is provided in the illustrated embodiment radially inwardly with an elastic bush which is designated by reference numeral 427, into which projects a pin 428 coordinated to the cardan shaft 404.

Figure 7:
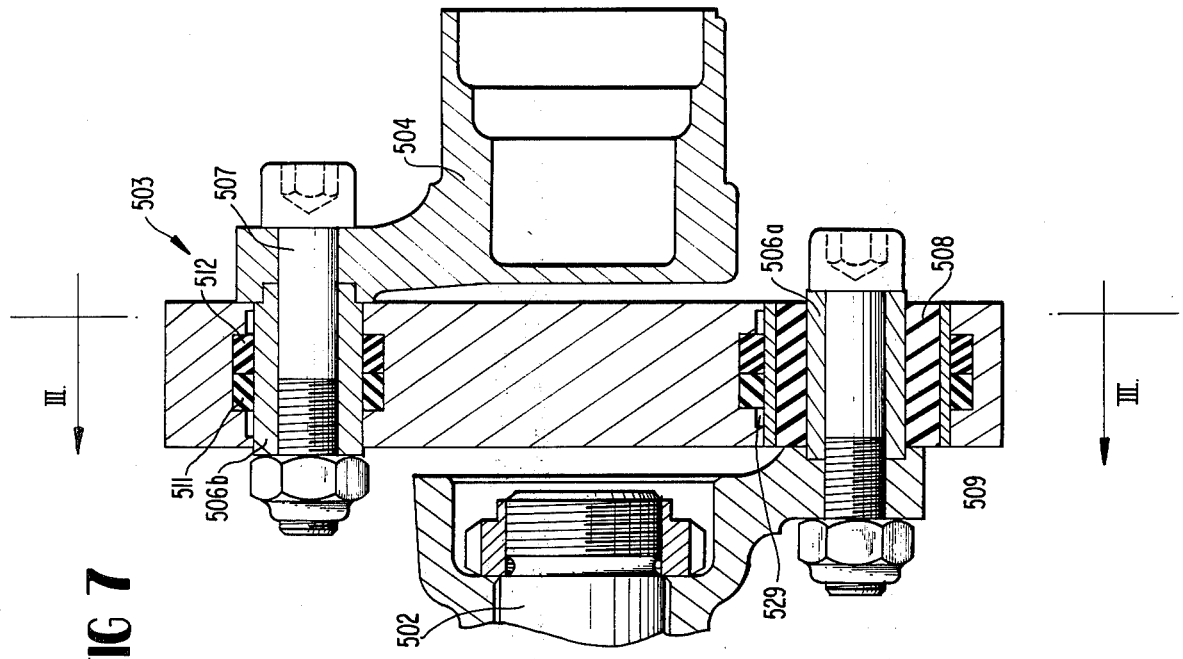
FIG. 7 is an axial cross-sectional view, similar to FIGS. 1 and 5 and illustrating still another modified embodiment of a shaft coupling in accordance with the present invention.
Figure 8:
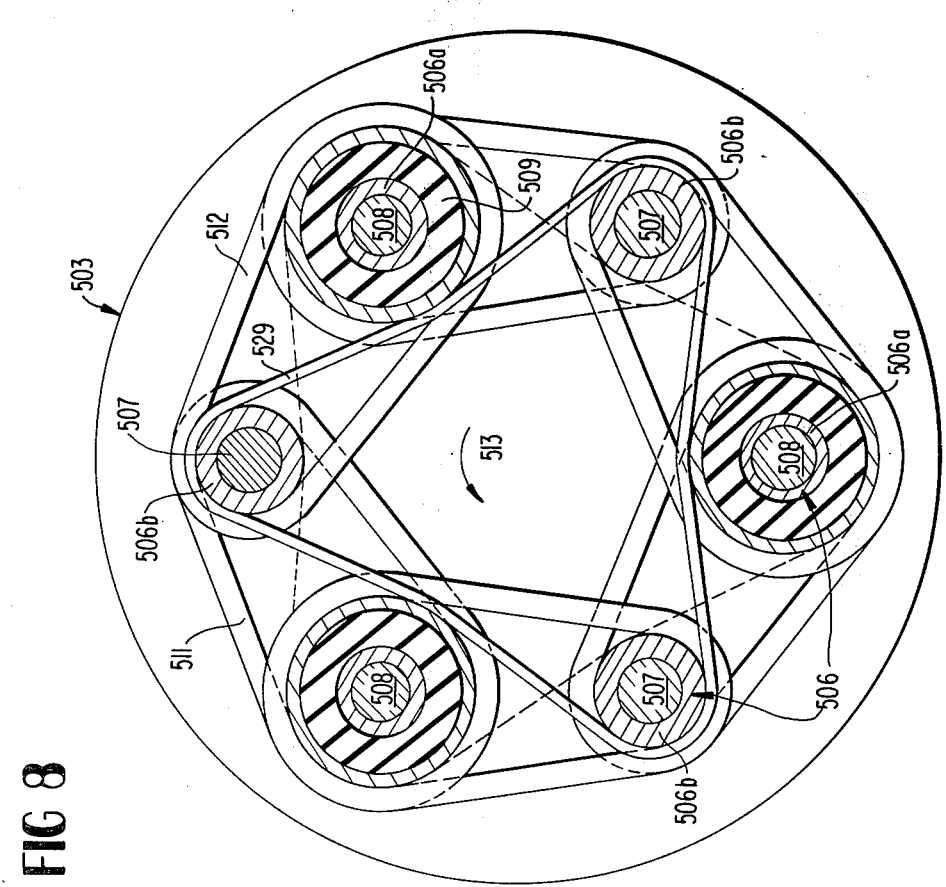
FIG. 8 is a cross-sectional view of the shaft coupling illustrated in FIG. 7 and taken along line VIII—VIII of FIG. 7.

FIGS. 7 and 8 illustrate a further modified embodiment of an elastic shaft coupling according to the present invention which is generally designated by reference numeral 503 and which is constructed as self-centering shaft coupling. In addition to the elements already described hereinabove by reference to the preceding embodiments, which are used in this embodiment analogously and are designated by analogous reference numerals of the 500 series, a band loop 529 is provided in this embodiment which is so guided over the altogether six connecting elements 506 of the shaft coupling 503 that it is supported on respective successive connecting elements alternately radially inwardly and radially outwardly. In conjunction with the fact that in the illustrated embodiment, elastic intermediate members 509 are coordinated to the connecting elements 506a disposed in front in relation to the direction of rotation 513 in the pulling operation, whereas this is not the case with respect to the connecting elements 506b disposed to the rear in the direction of rotation 513 in the pulling operation, the band loop 529 is supported with respect to the connecting elements 506a by way of the elastic intermediate member 509 whereas it rests directly on the connecting elements 506b, i.e., without elastic interposition. Furthermore, in the concrete embodiment, the band guidance is such that the band loop 529 is guided over the connecting elements 506b radially outwardly whereas it is supported radially inwardly with respect to the connecting elements 506a.

If reference isbmade in the preceding description to a band loop, then it is, of course, also possible within the scope of the present invention, as also partly illustrated in the embodiments, to form the band loop by two or several partial bands axially offset with respect to one another in order to arrive at a symmetrical load distribution inside of the elastic base body.

In view of the fact that the shaft coupling 503 according to FIGS. 7 and 8 is constructed self-centering, no central support needs to be provided with respect to the transmission output shaft or the cardan shaft.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An elastic shaft coupling, comprising a disk-shaped elastic base body means, and an even number of connecting elements having substantially parallel axes and arranged in the base body means substantially about the center axis thereof, circumferentially successive ones of the connecting elements being coordinated to opposite connecting sides and being connected by way of at least one loop-like band means, characterized in that the band means rests on at least one of the connecting elements by way of an elastic intermediate member.

2. A shaft coupling according to claim 1, characterized in that the intermediate member is coordinated to the connecting element which is disposed in front in the direction of rotation during the pulling operation.

3. A shaft coupling according to claim 2, characterized in that the intermediate member is coordinated to the connecting element which is disposed to the rear during the pulling operation.

4. A shaft coupling according to claim 1, characterized in that the intermediate member is constructed as elastic bush means.

5. A shaft coupling according to claim 4, characterized in that the connecting element is constructed as sleeve means.

6. A shaft coupling according to claim 5, characterized in that the sleeve means forms a carrier of the intermediate member formed by a bush means.

7. A shaft coupling according to claim 5, characterized in that the connecting element is provided with external extensions which extend approximately radially to the center axis.

8. A shaft coupling according to claim 7, characterized in that the sleeve-shaped connecting element is formed by two tubular halves having outwardly bent edges which form the extensions.

9. A shaft coupling according to claim 7, characterized in that the extensions are so inclined that the support surfaces for the intermediate member formed by the same are disposed approximately perpendicularly to the sections of the band means.

10. A shaft coupling according to claim 5, characterized in that the connecting element is constructed as oval hollow body means elongated in the radial direction.

11. A shaft coupling according to claim 8, characterized in that the elastic intermediate member is provided with at least one recess radial wit respect to the center of the base body means.

12. A shaft coupling according to claim 11, characterized in that the intermediate member is bush-shaped and is provided with a recess beyond the extensions.

13. A shaft coupling according to claim 1, characterized in that the coupling is constructed self-centering and is provided with a band-loop means which is supported alternately radially inwardly and radially outwardly on respective successive connecting elements.

14. A shaft coupling according to claim 1, characterized in that the base body means is provided centrally with a centering bush means which is connected with at least three radially symmetrically arranged connecting elements by way of at least one band means each.

15. A shaft coupling according to claim 14, characterized in that each band means is formed by an endless band.

16. A shaft coupling according to claim 1, characterized in that the intermediate member is coordinated to the connecting element which is disposed to the rear during the pulling operation.

17. A shaft coupling according to claim 1, characterized in that the connecting element is constructed as sleeve means.

18. A shaft coupling according to claim 1, characterized in that the connecting element is provided with external extensions which extend approximately radially to the center axis.

19. A shaft coupling according to claim 18, characterized in that the sleeve-shaped connecting element is formed by two tubular halves having outwardly bent edges which form the extensions.

20. A shaft coupling according to claim 18, characterized in that the extensions are so inclined that the support surfaces for the intermediate member formed by the same are disposed approximately perpendicularly to the sections of the band means.

21. A shaft coupling according to claim 1, characterized in that the connecting element is constructed as oval hollow body means elongated in the radial direction.

22. A shaft coupling according to claim 1, characterized in that the elastic intermediate member is provided with at least one recess radial with respect to the center of the base body means.

23. A shaft coupling according to claim 22, characterized in that the connecting element is provided with external extensions which extend approximately radially to the center axis.

24. A shaft coupling according to claim 23, characterized in that the intermediate member is bush-shaped and is provided with a recess beyond the extensions.

* * * * *